US008255901B2

(12) United States Patent
Halbedel et al.

(10) Patent No.: US 8,255,901 B2
(45) Date of Patent: Aug. 28, 2012

(54) METHODS AND SYSTEMS FOR CONFIGURING SOFTWARE APPLICATIONS

(75) Inventors: Ralf Halbedel, Heidelberg (DE); Wolfgang Kuhn, Sinsheim (DE)

(73) Assignee: SAP AG, Walldorf (DE)

( * ) Notice: Subject to any disclaimer, the term of this patent is extended or adjusted under 35 U.S.C. 154(b) by 1170 days.

(21) Appl. No.: 11/508,231

(22) Filed: Aug. 23, 2006

(65) Prior Publication Data
US 2007/0168947 A1 Jul. 19, 2007

Related U.S. Application Data

(60) Provisional application No. 60/750,780, filed on Dec. 16, 2005.

(51) Int. Cl.
*G06F 9/44* (2006.01)
*G06F 9/445* (2006.01)

(52) U.S. Cl. ........ 717/174; 717/100; 717/101; 717/102; 717/103; 717/120; 717/175; 717/176; 717/177

(58) Field of Classification Search .................. 717/100, 717/174, 120; 707/1, 10
See application file for complete search history.

(56) References Cited

U.S. PATENT DOCUMENTS

| | | | | |
|---|---|---|---|---|
| 5,706,502 A | * | 1/1998 | Foley et al. ................. | 717/120 |
| 5,991,534 A | * | 11/1999 | Hamilton et al. .............. | 717/111 |
| 6,327,705 B1 | * | 12/2001 | Larsson et al. ................. | 717/174 |
| 6,934,697 B1 | * | 8/2005 | Warren ................................ | 1/1 |
| 6,948,167 B1 | * | 9/2005 | Queisser et al. .............. | 717/177 |
| 7,412,687 B2 | * | 8/2008 | Goodwin et al. ............. | 717/104 |
| 7,610,583 B2 | * | 10/2009 | Milius ........................... | 717/177 |
| 2002/0069081 A1 | * | 6/2002 | Ingram et al. ..................... | 705/1 |
| 2003/0023839 A1 | * | 1/2003 | Burkhardt et al. ................ | 713/1 |
| 2003/0225925 A1 | * | 12/2003 | Kusterer et al. .............. | 709/315 |
| 2003/0233631 A1 | * | 12/2003 | Curry et al. ................... | 717/100 |
| 2004/0025154 A1 | * | 2/2004 | Sedlack ......................... | 717/168 |
| 2004/0025155 A1 | * | 2/2004 | Sedlack et al. ................ | 717/174 |
| 2004/0123284 A1 | * | 6/2004 | Bryant et al. ................. | 717/174 |
| 2004/0205748 A1 | * | 10/2004 | Iyer ................................ | 717/174 |
| 2006/0294506 A1 | * | 12/2006 | Dengler et al. ............... | 717/131 |
| 2007/0061702 A1 | * | 3/2007 | Letkeman ..................... | 715/511 |

OTHER PUBLICATIONS

Hemer, "Specification matching of state-based modular components", Proceedings of the Tenth Asia-Pacific Software Engineering Conference (APSEC'03), 2003, IEEE, pp. 1-10.*
Heineman, "A Model for Designing Adaptable Software Components", ACM SIGSOFT Software Engineering Notes vol. 25 No. 1, Jan. 2000, pp. 55-56.*
Bontis et al, "The Knowledge TOOLBOX: A Review of the Tools Available to Measure and Manage Intangible Resources", European Management Journal, vol. 17, No. 4, 1999, pp. 1-21.*

* cited by examiner

*Primary Examiner* — Emerson Puente
*Assistant Examiner* — Charles Swift
(74) *Attorney, Agent, or Firm* — Finnegan, Henderson, Farabow, Garrett & Dunner, LLP

(57) ABSTRACT

Systems, methods, and computer program products are provided for customizing software application programs, including self-service applications. In one implementation, a customer selects software components from a standard set of components provided by a developer. The selected software components are then used to form a customized software application. Thereafter, the customized software application may be used by an end user to perform one or more tasks.

23 Claims, 15 Drawing Sheets

FIG. 2b

| Patterns | Workflow associated with pattern |
|---|---|
| Application Floor Plans e.g. Account, Personal Administration, Company, Time Management... | e.g. Activity<br>• inspection<br>• employee managment |
| User Interface Patterns e.g. Roadmap with controls | Perform Task e.g. entering data, confirm, submit |
| User Interface Controls e.g. scroll bar, button | e.g. Enter String, Press button | level of granularity: lowest (top) → highest (bottom)

Reminder of Dates

Display Dates/Tasks for All Employees in ◀ November 2004 ▶

| Date | Event | Name |
|---|---|---|
| 11/2/2004 | Date of Birth (58) | Mr. Chris Graham |
| 11/2/2004 | Date of Birth (58) | Mr. Chris Graham |
| 11/4/2004 | Date of Birth (49) | Mrs Carmen Green |
| 11/5/2004 | Date of Birth (53) | Mr. Jeremy Young |
| 11/5/2004 | Date of Birth (53) | Mr. Jeremy Young |
| 11/7/2004 | Date of Birth (57) | Mr. Paul Sanderson |
| 11/11/2004 | Date of Birth (44) | Mr. Harry Henderson |
| 11/12/2004 | Date of Birth (59) | Ford X'aver |
| 11/14/2004 | Anniversary (10) | Miss Mary Del Vecchio |
| 11/15/2004 | Date of Birth (40) | Mr. Edward Roche |
| 11/15/2004 | Date of Birth (40) | Mr. Edward Roche |
| 11/20/2004 | Date of Birth (44) | Mr. Scott Parker |
| 11/20/2004 | Date of Birth (40) | Mr. Paul Bennett |
| 11/20/2004 | Date of Birth (40) | Mr. Paul Bennett |
| 11/21/2004 | Date of Birth (38) | Mr. Nicholas McConville |

|◀ ◀ ▶ ▶| Page 1/2

* Reminder Date

---

Personalize iView - Microsoft Internet Explorer provided by

Reminder of Dates

You can personalize this iView by assigning values to the following properties:

| Property | Assigned value |
|---|---|
| Anniversaries to Be Displayed (eg. 10, 20, 25, 30, 40-50) | 10,20,25,30,40,50 |
| Display Anniversaries | True |
| Display Birthdays | True |
| Display Data from Monitoring of Tasks | True |
| Number of Dates/Tasks Displayed Per Page (Number <= 0 Displays All Entries) | 15 |

[Save] [Cancel] [Restore Defaults]

FIG. 9

METHODS AND SYSTEMS FOR CONFIGURING SOFTWARE APPLICATIONS

CROSS-REFERENCE TO RELATED APPLICATION(S)

This application claims the benefit of priority from U.S. Provisional Application No. 60/750,780, entitled "Methods and Systems for Configuring Software Applications," filed on Dec. 16, 2005, the disclosure of which is expressly incorporated herein by reference to its entirety.

TECHNICAL FIELD

The present invention generally relates to the field of computer software and customizable software applications. More particularly, the invention relates to methods, systems, and computer program products for customizing computer software applications. Customization may be achieved by modifying, for example, a floorplan of the software application.

BACKGROUND INFORMATION

In today's marketplace, businesses and other entities use various computer software applications to aid in their day-to-day activities. These software applications are often designed with a specific set of functionality and offered as a complete package by software vendors. Whether for keeping track of employee time and attendance, providing online airline travel planning, or for any other service involving user input and selection, these software applications can greatly increase a company's efficiency and profitability. In some instances, these applications—typically referred to as self-service applications—form the centerpiece of a company's business, such as the business activities of an online vendor. In other situations, self-service applications merely aid in more peripheral areas, such as operations or payroll. In either case, self-service applications are widely used and can be costly to build and implement.

In view of the high cost of building individual self-service applications for each business customer, there is a need for a customizable framework for configuring self-service applications. Moreover, there is a need for solutions to customize applications in a modification-free way or manner in which all adjustments made by a customer are stored separately, such as in a separate customer-namespace on a customer's server(s).

SUMMARY OF THE INVENTION

In accordance with embodiments of the invention, methods, systems and computer program products are provided for customizing computer software applications, such as self-service applications.

In accordance with one embodiment, a framework is provided for configuring software applications. Consistent with this embodiment, a floorplan is provided, including all of the building blocks of the self-service application. The floorplan may be customized by a business customer or other administrator (hereinafter referred to as a "customer"), without requiring alterations of software code or changes to the development infrastructure.

According to an embodiment of the invention, a computer program is provided that comprises a standard set of components created by a developer. The components are then selected by a customer and formed into an application program based on the selection, whereby the application program is capable of being used to perform one or more tasks. By way of example, the components may comprise visual application components, business logic components, and configuration components.

In accordance with one embodiment of the invention, a system is provided for customizing application programs. The system comprises a standard set of computer software components, the components comprising visual application components, business logic components, and configuration components. The system also includes an editor application for enabling a customer to identify a selected set of components from the standard set of computer software components, and an application compiler for forming a customized application program based on the selected set of components. According to this embodiment, a computer system can be configured to use at least a portion of the application program to perform one or more tasks.

In accordance with another embodiment of the present invention, a method is provided for customizing application programs. The method includes: providing a standard set of computer software components, the computer software components comprising visual application components, business logic components, and configuration components. The method also includes selecting a set of components from the standard set of computer software components, the selected set of components being identified by a customer, and forming a customized application program based on the selected set of components. The customized application program can then be used to perform at least one task.

In accordance with another embodiment of the present invention, a method is provided for forming a customized software application. The method comprises providing, to a customer, a standard set of computer software components, the computer software components being generated by a developer. The method also includes identifying a selected set of components from the standard set of components based on input from the customer, and forming a customized application program from the selected set of components.

In accordance with yet another embodiment of the invention, one or more objects may be stored in a database at a customer's location. The objects, which may comprise delta objects, may then be combined with elements of the standard set components to form the customized application program.

BRIEF DESCRIPTION OF THE DRAWINGS

The accompanying drawings, which are incorporated in and constitute a part of this disclosure, illustrate various embodiments and aspects of the present invention. In the drawings:

FIGS. 2*b* and 2*c* are illustrations of exemplary patterns, consistent with certain embodiments of the present invention;

FIG. 3 is a conceptual diagram of pattern granularity, consistent with certain embodiments of the present invention;

FIG. 7 is an illustration of an exemplary perspective screen view, consistent with certain embodiments of the present invention;

FIG. 9 is an illustration of an exemplary user entry screen for personalization, consistent with certain embodiments of the present invention;

DETAILED DESCRIPTION

Figure 1:
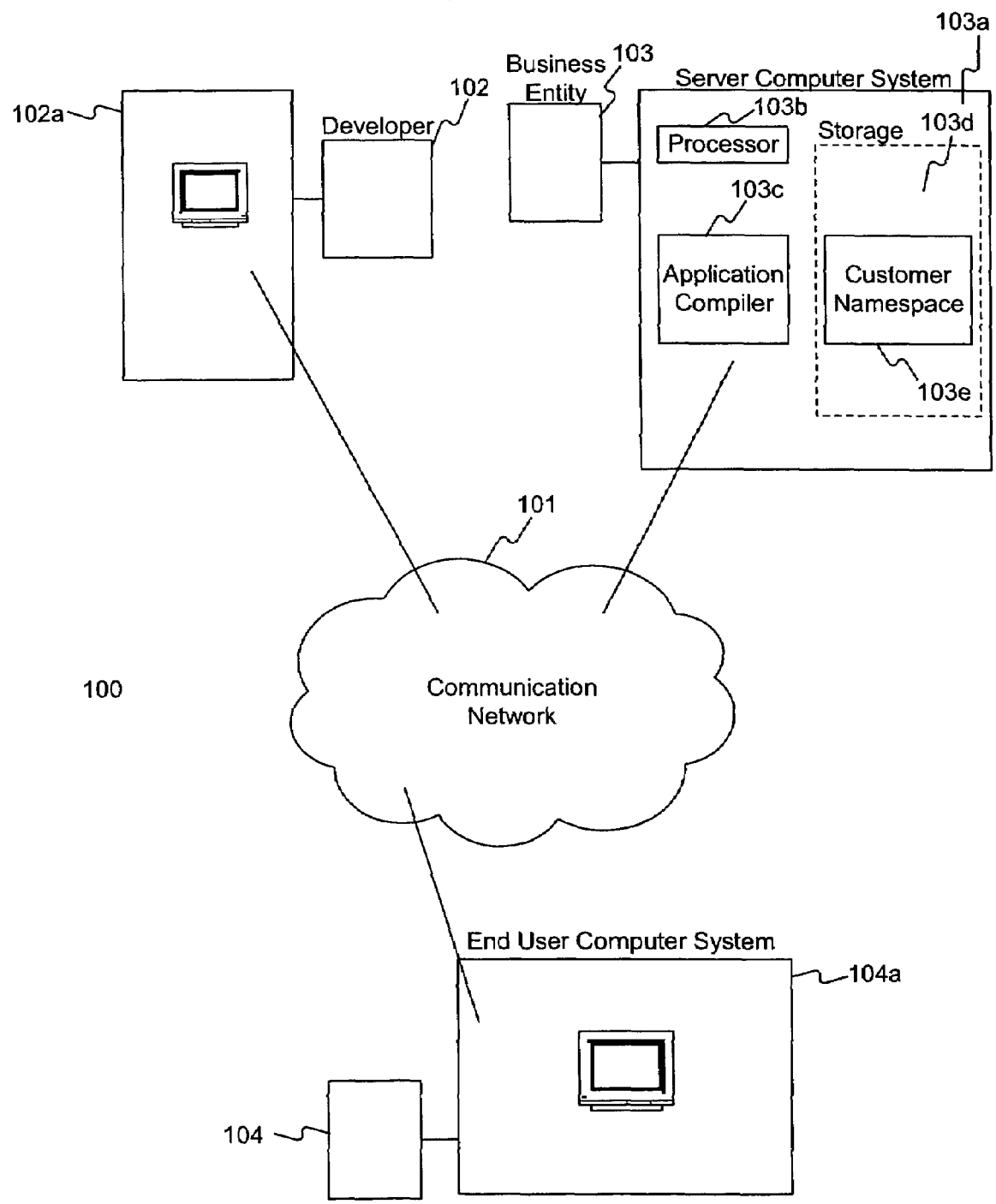
FIG. 1 is a block diagram of an exemplary system environment, consistent with certain embodiments of the present invention.

The following detailed description refers to the accompanying drawings. Wherever possible, the same reference numbers are used in the drawings and the following description when referring to the same or similar parts. While several exemplary embodiments and features of the invention are described herein, modifications, adaptations, and other implementations are possible without departing from the spirit and scope of the invention. Accordingly, the following detailed description does not limit the invention. Instead, the proper scope of the invention is defined by the appended claims.

The phrase "and/or" as used in this application with regard to a list of items means that any one of the items may constitute the described group of items or alternatively any combination of the items may constitute the described group.

Systems and methods consistent with certain embodiments of the present invention provide business entities with customizable computer software applications. The disclosed embodiments may be implemented in various system environments, including computer-based environments that use, for example, personal computers, workstations, servers, laptops, personal digital assistants (PDAs), mobile phones, handheld devices, and the like. The disclosed embodiments may also be implemented using other types of environments, such as for example, television-implemented graphical user interfaces, telephone-based user applications, and the like. Embodiments of the present invention, however, are not limited to such examples, and may be implemented using other types of environments, platforms, and/or infrastructures.

The storage media referred to herein symbolize elements that temporarily or permanently store data and/or instructions. The storage functions associated with the disclosed embodiments of the present invention may be implemented via a computer, portions of a computer, a processor, a computer network, and any other component and medium capable of storing information. For example, various types of storage media may be used to store information associated with the embodiments of the present invention, such as read-only memory (ROM), random access memory (RAM), and any other type of memory. Further, the storage functions associated with the disclosed embodiments may be physically implemented by computer-readable media, such as, for example: (a) magnetic media (e.g., a magnetic disk, a tape drive, etc.), (b) optical media (e.g., a CD-ROM, digital versatile disk (DVD), a mini-disc, etc.); and (c) semiconductor media (e.g., DRAM, SRAM, EPROM, EEPROM, memory stick, flash memory, etc.).

The disclosed embodiments consistent with the present invention may also include computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). Such networks may include a wired and/or wireless network, such as a local area network (LAN), a wide area network (WAN), storage area network (SAN), a public switched telephone network (PSTN), an Integrated Services Digital Network (ISDN), an infrared (IR) link, a radio link, such as a Universal Mobile Telecommunications System (UMTS), Global System for Mobile Communications (GSM), Code Division Multiple Access (CDMA), broadcast radio network, cable television network, and a satellite link.

Further embodiments consistent with the present invention may be implemented using various types of transmission protocols and data formats, such as, for example, transmission control protocol/internet protocol (TCP/IP), hyper text transfer protocol (HTTP), secure HTTP, wireless application protocol (WAP), hyper text markup language (HTML), extensible markup language (XML), Standard Generalized Markup Language (SGML), etc.

Embodiments of the present invention may be implemented using any one or more software platforms capable of carrying out the features of the present invention. An exemplary embodiment of the present invention uses Web Dynpro for Java™, developed by SAP AG of Walldorf, Germany, and further employs the use of J2EE™ and Java VM™ (Virtual Machine) tools. However, any known software platform can be used to implement the features of the present invention, including ActiveX™, JavaScript™, C++, and the like.

FIG. 1 illustrates an exemplary system environment 100 for implementing certain embodiments of the present invention. As shown in FIG. 1, system 100 may comprise a communication network 101, a developer 102, a developer computer system 102*a*, a customer 103 (such as a business entity), a server computer system 103*a*, an end user 104, and an end user computer system 104*a*. The communication network 101 may be a network that communicates information between elements of the system environment, such as developer 102, developer computer system 102*a*, business customer 103, server computer system 103*a*, end user 104, and/or end user computer system 104*a*. End user 104 may be related to customer 103 (e.g., an employee) or may be a third party. Further, in certain embodiments, communication network may comprise a computer network, a postal mail network, a cable television network, a telephone network, a combination of networks (e.g., the Internet), and/or any other type of network that includes wired, wireless, or other types of medium to exchange information between elements of system environment 100.

Developer 102 may be a software vendor or any individual, group, or other entity capable of developing computer software applications. Associated with developer 102 is developer computer system 102*a*. Developer computer system 102*a* may be used to create components that make up a computer software application. Developer computer system 102*a* may be a computer system that executes program code to perform one or more processes consistent with certain embodiments of the present invention. Developer computer system 102a may be configured as a single computer, such as a personal computer or server, or as a distributed computer system implemented across a number of computer devices or components, such as a computer network. Developer computer system 102a may comprise any combination of servers, PCs, workstations, PDAs, laptops, cell phones, or similar devices, capable of performing methods and features consistent with embodiments of the claimed invention.

Customer 103 may represent a business entity or any other individual, group, or entity capable of customizing computer software application(s) provided by developer 102 and using customized computer software application(s) to allow an end user to perform one or more tasks. In one embodiment, customer 103 may be an online service provider that uses customized computer software applications to serve its customers or end users. For example, customer 103 may be a business customer such as an online retailer, a provider of transportation services, an online bank, a company that runs online surveys, or any other company or online provider of end-user services. In another embodiment, customer 103 may be a company or agency that uses customized computer software applications to aid in certain core or peripheral aspects of its operations. For example, customer 103 may be a government agency or private company that uses self-service applications to collect and obtain business-related information, such as inventory records, employee time and attendance records, billing records, and the like. The term "customer," however, should not be construed as limited by these examples. Thus, for the purposes of this application, customer 103 may be any individual, group, or entity that uses customized computer software applications to allow an end user to perform tasks. By way of additional examples, customer 103 may be a non-profit organization, or an individual who provides free services to others. The types of customized computer software applications described include so-called "self-service applications."

Associated with customer 103 is server computer system 103a. Server computer system 103a may be used to create a customized software application, such as a self-service application. Server computer system 103a may be a computer system that executes program code to perform one or more processes consistent with certain embodiments of the present invention. Server computer system 103a may be configured as a single computer, such as a personal computer or server, or as a distributed computer system implemented across a number of computer devices or components, such as a computer network. Server computer system 103a may comprise any combination of servers, PCs, workstations, PDAs, laptops, cell phones, or similar devices, capable of performing methods and features consistent with embodiments of the invention.

As shown in FIG. 1, server computer system 103a comprises a processor 103b, an application compiler 103c and a storage unit 103d. Processor 103b may be one or more processors that execute program code to perform one or more processes consistent with certain embodiments of the present invention. For example, processor 103b may process information received from developer 102 and/or stored in storage unit 103d to perform methods consistent with embodiments of the invention.

Application compiler 103c comprises software, hardware, and/or firmware configured to compile a customized application (e.g., a self-service application) based on the computer software application received from developer 102 and information stored in customer namespace 103e. Application compiler 103c may be any computer program or portion of a computer program capable of using the computer software application received from developer 102 and information stored in the customer namespace 103e to create a customized software application.

Storage unit 103d may be one or more storage devices that store information associated with certain aspects of the present invention. Storage unit 103d may include a business customer namespace 103e that stores information related to a selected customization of a computer software application, and may also include space to store the computer software application received from developer 102. According to one embodiment of the present invention, the customer namespace is stored in a separate location from other information associated with the computer software application received from developer 102. The separate location may be a separate location within the same storage unit 103d, or a different storage unit altogether. However, the customer namespace may alternatively be stored in the same location as the other information associated with the computer software application received from the developer 102. Examples of the information that may be stored in customer namespace 103e will be further discussed below.

End user 104 may be any individual or entity that interacts with the customized computer software application provided by customer 103. For example, in one embodiment, end user 104 may be a computer user on the Internet who wishes to utilize the services of an online service provider and who performs tasks related to the online service. In another embodiment, end user 104 may be an employee or manager of a company or agency who wishes to use self-service applications to perform tasks, such as inventory entry, time entry, billing entry, employee information entry, and the like. Furthermore, end user 104, is not limited to a person or group of people. Alternatively, in another embodiment, end user 104 may be a computer-implemented process capable of interacting with the self-service application provided by business customer 103.

Associated with end user 104 is end user computer system 104a. End user computer system 104a may be used to perform one or more tasks associated with all or a portion of a self-service application. End user computer system 104a may be a computer system that executes program code to perform, for example, one or more processes consistent with certain embodiments of the present invention. End user computer system 104a may be configured as a single computer, such as a personal computer or server, or as a distributed computer system implemented across a number of computer devices or components, such as a computer network. End user computer system 104a may comprise any combination of servers, PCs, workstations, PDAs, laptops, cell phones, or similar devices, capable of performing methods consistent with embodiments of the invention.

In one embodiment of the present invention, a self-service application is built based on three types of components: visual application components (VACs), configuration components (CCs), and business logic components (BLCs). Visual application components are used to create visual displays on a computer screen. VACs can display data on the screen, handle user input, and/or trigger events. By way of example, FIG. 2a illustrates various implementations of VACs.

Figure 2A:
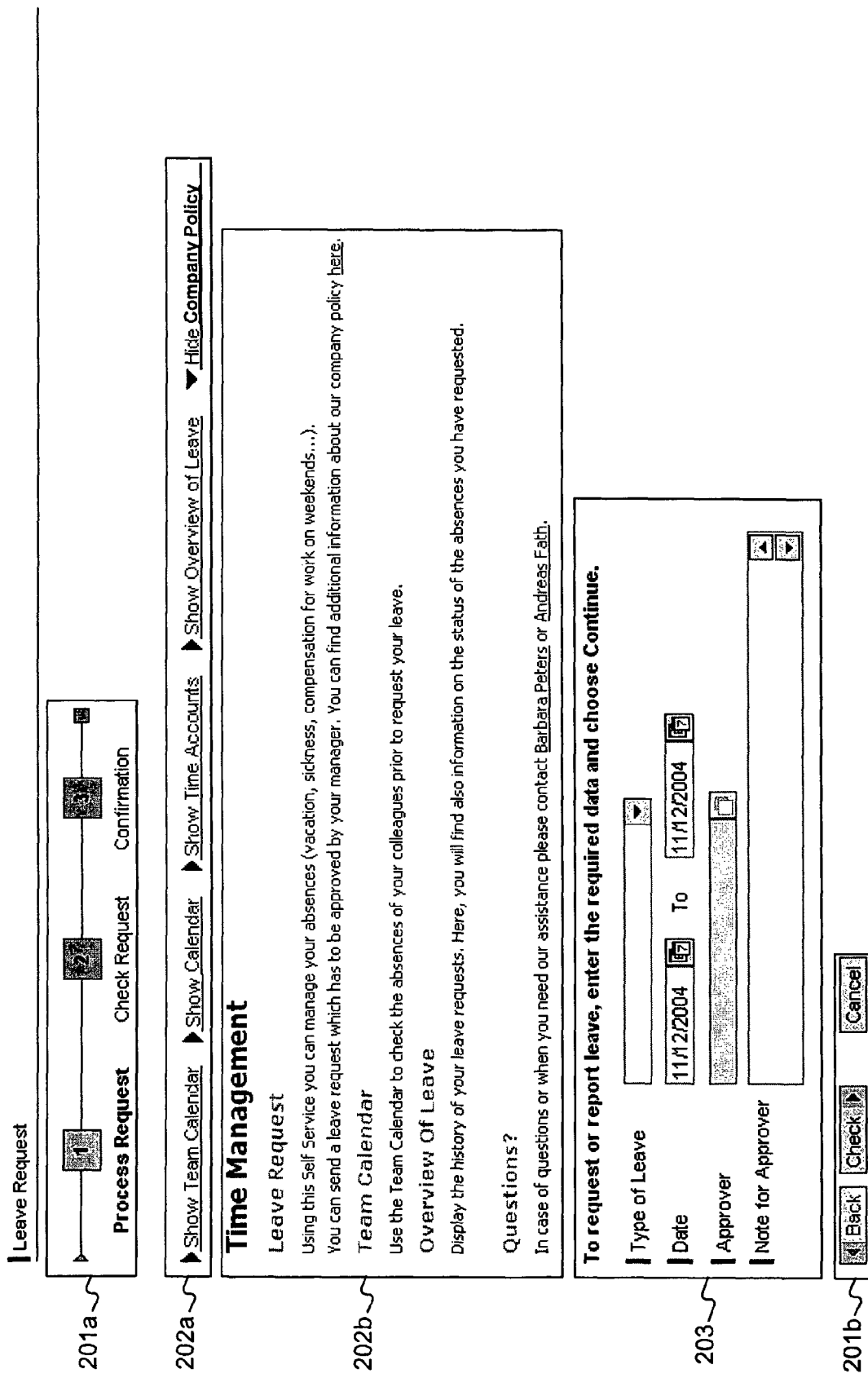
FIG. 2*a* is an illustration of an exemplary perspective screen view, consistent with certain embodiments of the present invention.

FIG. 2a shows a "perspective" view for a computer software application. A perspective defines the visual content of an application in a certain state (e.g., a state related to a "Leave Request"). In accordance with one embodiment, the overall user interface of each self-service application is defined by the perspectives it contains and by the possible navigation paths between those perspectives.

FIG. 2a shows numerous displays created by VACs. For example, the "Check" button and "Cancel" button in area 201b are implemented in a VAC. Furthermore, the "Show Team Calendar" link and "Show Calendar" link in area 202a are additional implementations of VACs. In area 203, the various entry boxes labeled "Type of Leave," "Date," "Approver," and "Note for Approver" are implemented in one VAC, as is the text appearing below the "Time Management" label in area 202b. VACs consistent with embodiments of the present invention are not limited to these types of displays, but instead comprise any components of an application that are employed to display data on the screen, handle user input, and/or trigger events.

Certain combinations of VACs and/or other components frequently recur in self-service applications or other software applications. These may be considered "patterns." For example, in FIG. 2a, the roadmap steps 201a consisting of the steps "1," "2," and "3," may constitute a frequently recurring user interface pattern. Patterns may be defined on different levels of granularity. For example, on the highest level of granularity, a user interface element may comprise a single element, such as button or an application roadmap figure. The next level of granularity may aggregate a group of elements, thus constituting a user interface pattern. For example, roadmap steps 201a combined with the back, forward, and cancel buttons in area 201b constitute a roadmap user interface pattern. Similarly, the group of link-style labels in area 202a associated with a group of the textual displays or other windows 202b may constitute a context assistance pattern. A context assistance pattern thus offers the user context related information. An even lower level of granularity may be an application pattern, which may describe part or all of a particular self-service application. For example, the entire screen display shown in FIG. 2a may be just a portion of an application pattern. Application patterns may be designed in any way appropriate to aid in the use of recurring groups of VACs. As a non-limiting example, application patterns may be designed for a specific task, such as leave request as depicted in FIG. 2a, or for a particular group of users, such as managers at a company or employees at a company.

An application pattern containing all of the components necessary to implement a complete self-service application may be referred to as an "application floorplan." Consistent with an embodiment of the present invention, an application floorplan may be customized by a customer to create a customized self-service application. An application floorplan may be provided to a customer by itself or as part of a computer software package that may include additional application floorplans, an editor program, a compiler program, and/or other software components.

Figure 2B:
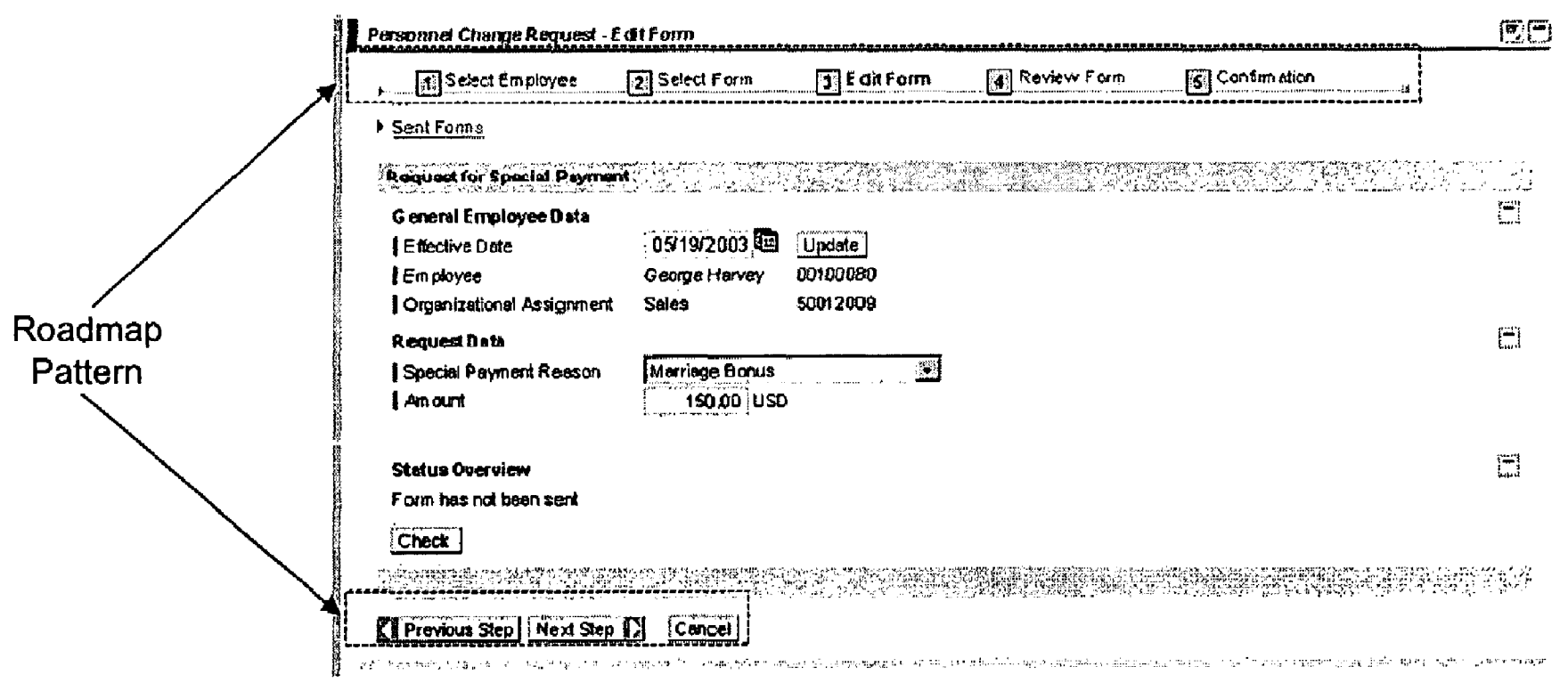
Figure 2C:
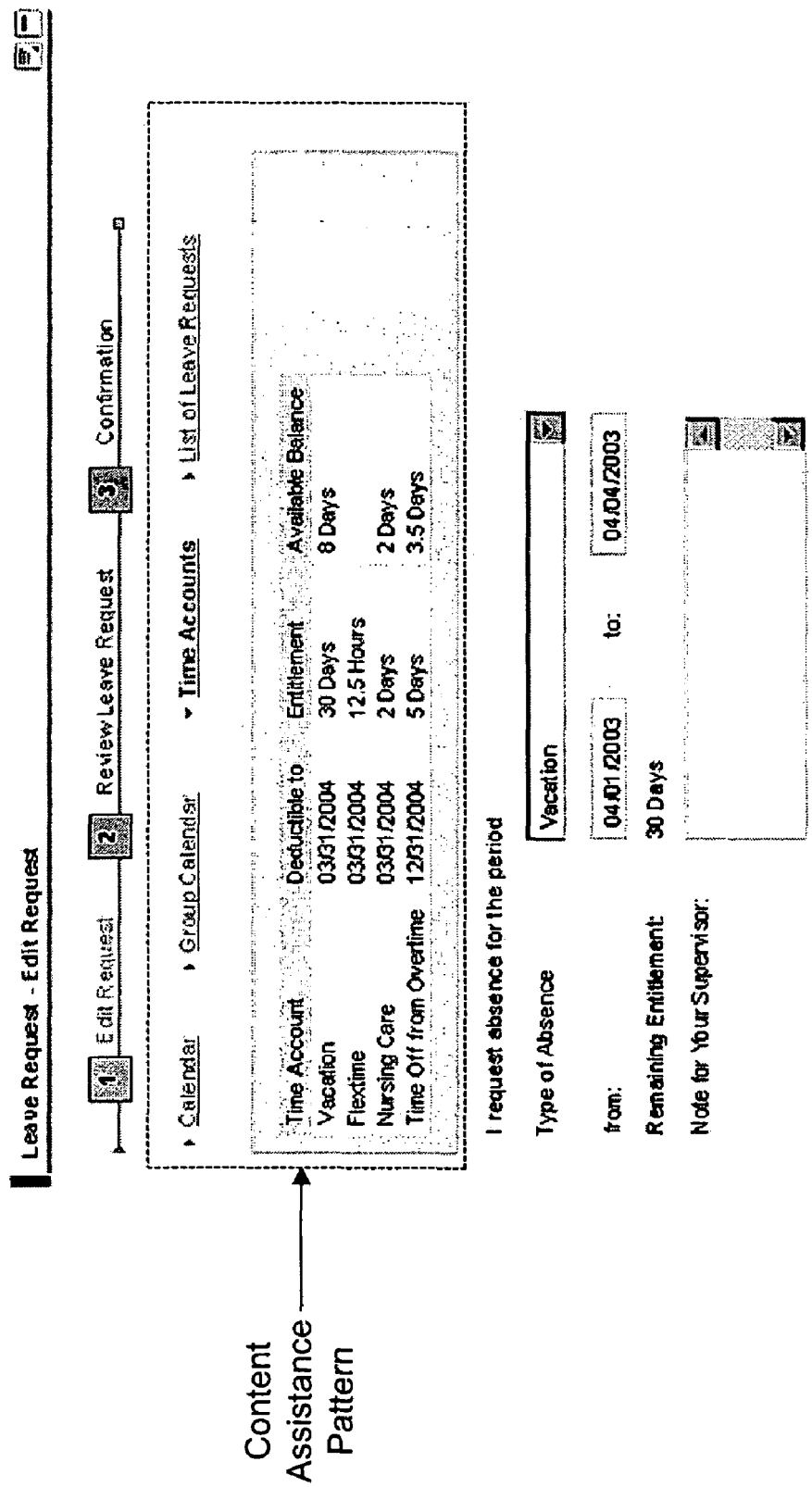

FIGS. 2b and 2c show further examples of a roadmap pattern and a context assistance pattern. FIG. 3 shows a conceptual view of the levels of granularity of user interface patterns implemented by VACs, consistent with certain embodiments of the present invention.

In addition to VACs, the components of the present invention further include configuration components (CCs) and business logic components (BLCs). Configuration components define the perspectives and navigation paths of a self-service application. For example, configuration components may describe which events cause a perspective to transition to another perspective. Thus, CCs bind together the various VACs and BLCs to form a workable, usable application. The BLCs are components that handle communication between the self-service application and a backend system. They typically prepare the front end data for sending to the backend and vice versa. For example, in reference to FIG. 2a, BLCs will be used to submit the data entered in entry boxes 203 to a backend program or database. Thus, BLCs allow for dynamic data entry and retrieval and other information processing.

Consistent with embodiments of the invention, VAC, CC, and BLC components may be implemented using any one of various software frameworks. In one exemplary embodiment, the components are implemented using Web Dynpro for Java, a development tool developed by SAP AG, of Walldorf, Germany.

Systems, methods, and computer program products consistent with certain embodiments of the present invention can provide business entities and other customers with the ability to create customized self-service applications based on application floorplans provided by a software vendor or other developer. A computer program developed by developer 102 (hereinafter "vendor program") may contain all of the software code and/or components necessary to allow a customer to customize one or more self-service applications. Thus, the vendor program may contain several components from which a business customer can select to create self-service applications. For example, the software application may contain a component for a time-entry VAC, another component for billing VAC, and additional components, as needed. The vendor program may additionally include an editor program and compiler program to aid in creating a customized self-service program.

Different self-service applications may contain different features and elements. Therefore, according to an embodiment of the present invention, business entities may be allowed to customize components by adding, removing, and/or modifying floorplan components and/or patterns to create a customized self-service application. Moreover, certain components and/or patterns may be so common that they appear in most or all self-service applications, e.g. the roadmap VACs. Thus, one embodiment of the present invention creates a set of generic patterns that appear in all or substantially all floorplans and may be used in all or substantially all self-service applications. A developer may or may not allow these generic patterns to be removed from the floorplan or otherwise modified. As a non-limiting example, the developer may force certain steps of a road-map pattern to appear in all self-service applications, but may permit certain business entities to alter the name and number of those steps.

Self-service applications may be implemented as event-driven programs. The visual elements of an application, such as buttons, checkboxes, and edit controls, may communicate with each other by raising events and reacting to events via the underlying software platform. Some events only have consequences inside the component that owns the screen element raising the event. For example, scrolling up and down a table of a table control, or switching the visibility of some screen elements to avoid screen clutter only affects the appearance of the table or the screen elements themselves. Other events affect components other than the one that raised the event. For example, navigation events where one perspective is replaced with another, or user events where an action inside one VAC influences what appears in another VAC, or data selection events that cause BLCs to get data from a backend system all affect components different from the component that raised the event.

In accordance with one embodiment, a floorplan manager (FPM) may be provided. During the execution of a self-service application, a FPM may control the steps taken by the self-service application resulting from particular events. The FPM controls the self-service application according to configuration components, which instruct the FPM how to react to particular events. Configuration components may further define relationships between one or more VACs and BLCs.

Consistent with another embodiment of the present invention, a customer may use a graphical user interface (GUI) to create a customized self-service application. THE GUI may be used to create a particular FPM application used to control the self-service application. An example of such a GUI is illustrated in FIG. 4.

Figure 4:
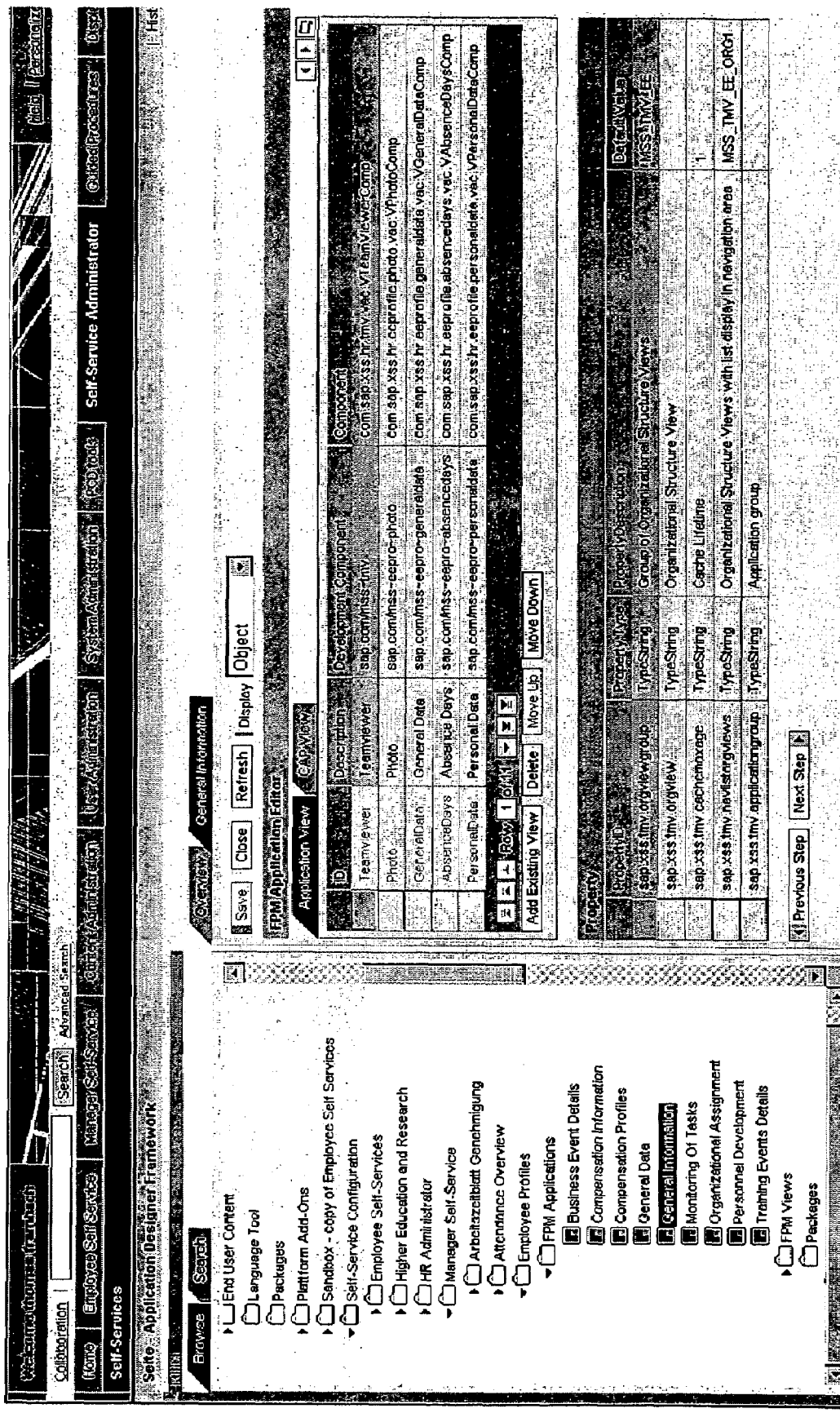
FIG. 4 is an illustration of an exemplary application editor screen or graphical user interface (GUI), consistent with certain embodiments of the present invention.

FIG. 4 shows an exemplary GUI for creating a customized self-service application. The GUI may be implemented as part of an enterprise portal program, such as for example, the SAP Enterprise Portal 6.0 developed by SAP AG of Walldorf, Germany. In accordance with one embodiment, the enterprise portal program includes a self-service administrator package that allows an administrator to use an editor program to select components and patterns to include in the self-service application. For example, the administrator may elect to include "General Information" VACs, such that the self-service application will display general information about employees. The administrator may then select various components to include in the "General Information" view by choosing the options shown in the tables of FIG. 4, for example.

FIGS. 5, 6a, 6b, and 6c show more detailed examples of GUIs for an editor program consistent with certain embodiments of the present invention. The editor program includes various GUIs, shown in FIGS. 5, 6a, 6b, and 6c. In an exemplary embodiment of the present invention, the editor program may include two editor sub-programs—one for FPM views and one for FPM applications. The editor sub-programs provide a user-friendly interface for an administrator or other user to select the components and properties for the FPM application. In one embodiment, the editor program may use Web Dynpro components to configure the FPM applications.

Figure 5:
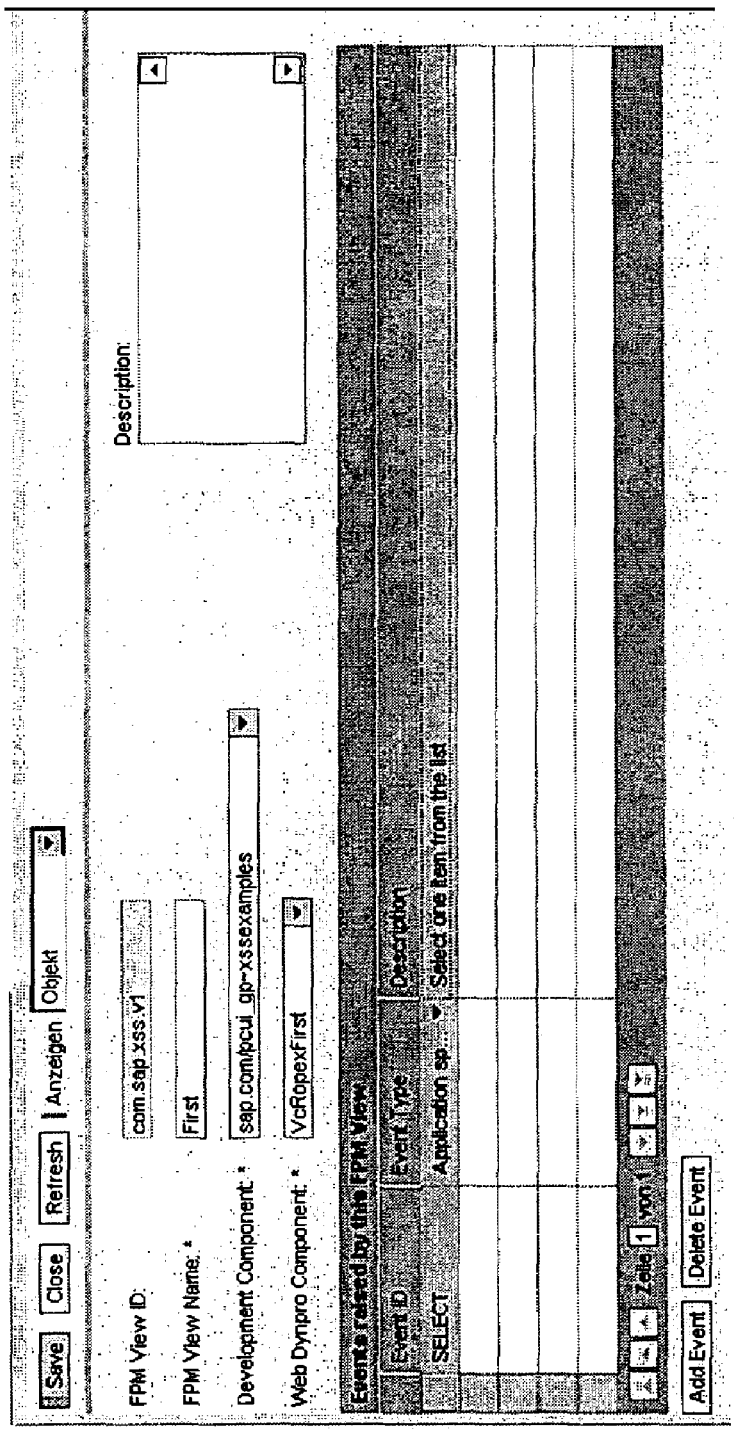
FIG. 5 is an illustration of an exemplary view editor GUI, consistent with certain embodiments of the present invention.

An exemplary GUI for an FPM view editor is shown in FIG. 5. The FPM view editor represents VACs and has two main properties: the name of the development component and the name of the Web Dynpro component. The FPM view editor may contain a list of event definitions and a list of FPM view properties. As shown in the example of FIG. 5, the list of event definitions may contain the event type, event ID, and event description. The event type may be an application specific event for events specific to a particular application, a save event for saving information, and/or a review and save event for reviewing and saving information. The event ID indicates the actual event being defined. Examples of event IDs include: EVENT_START, EVENT_SELECT, EVENT_ADD, EVENT_EDIT, EVENT_REMOVE, EVENT_REVIEW, EVENT_SAVE, EVENT_BACK, or any other name that identifies a defined event. The event description describes the event ID, and thus may include "start," "select," "add," etc. For each FPM view, it is possible to define a list of FPM view properties. The view properties describe aspects of the view. Examples of view properties include: string, translatable text, enumeration, boolean, etc. The definition of the view properties types typically includes a default value, and also includes an indicator of whether the property may be changed by certain users who wish to customize the FPM application. For example, properties may be changed by every user, by administrators only, or by no one at all.

Figure 6A:
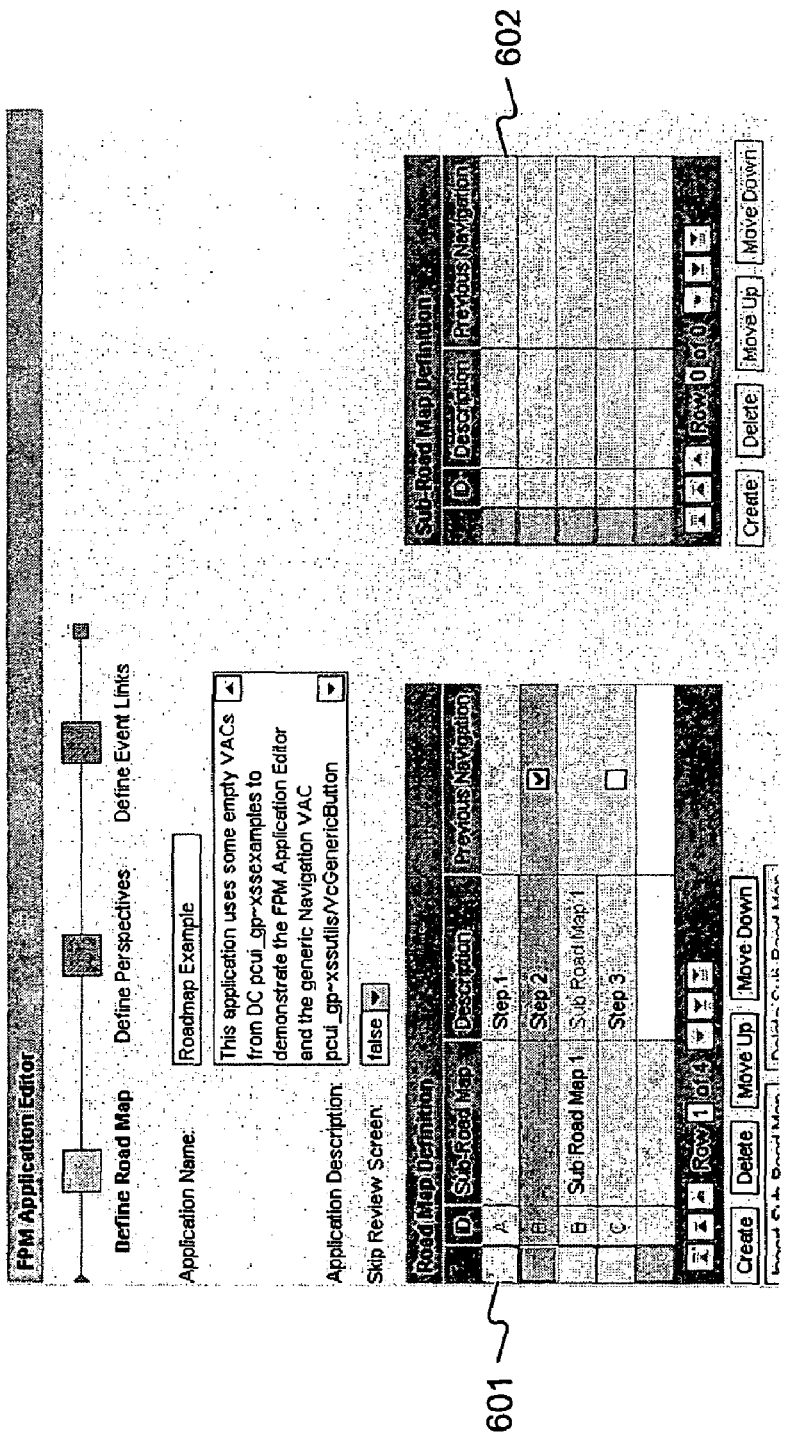
FIGS. 6*a*, 6*b*, and 6*c* are illustrations of exemplary application editor GUIs, consistent with certain embodiments of the present invention.
Figure 6B:
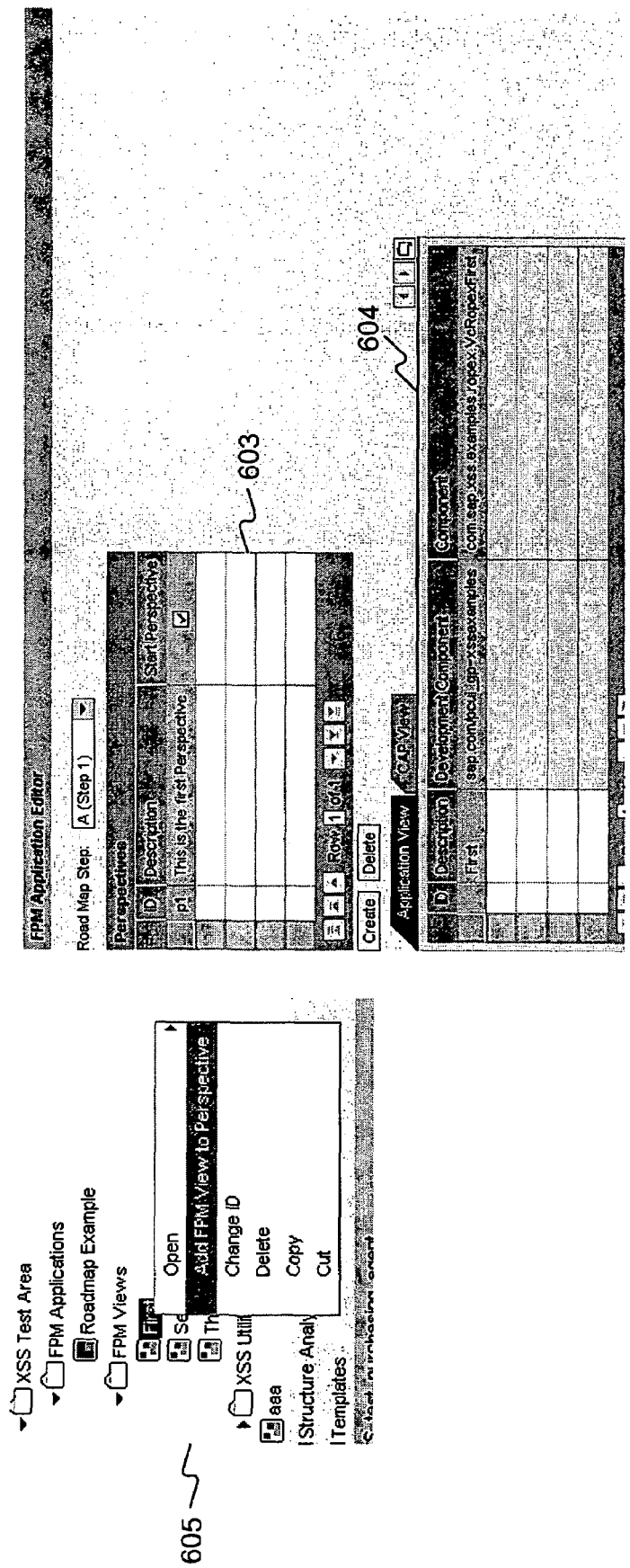
Figure 6C:
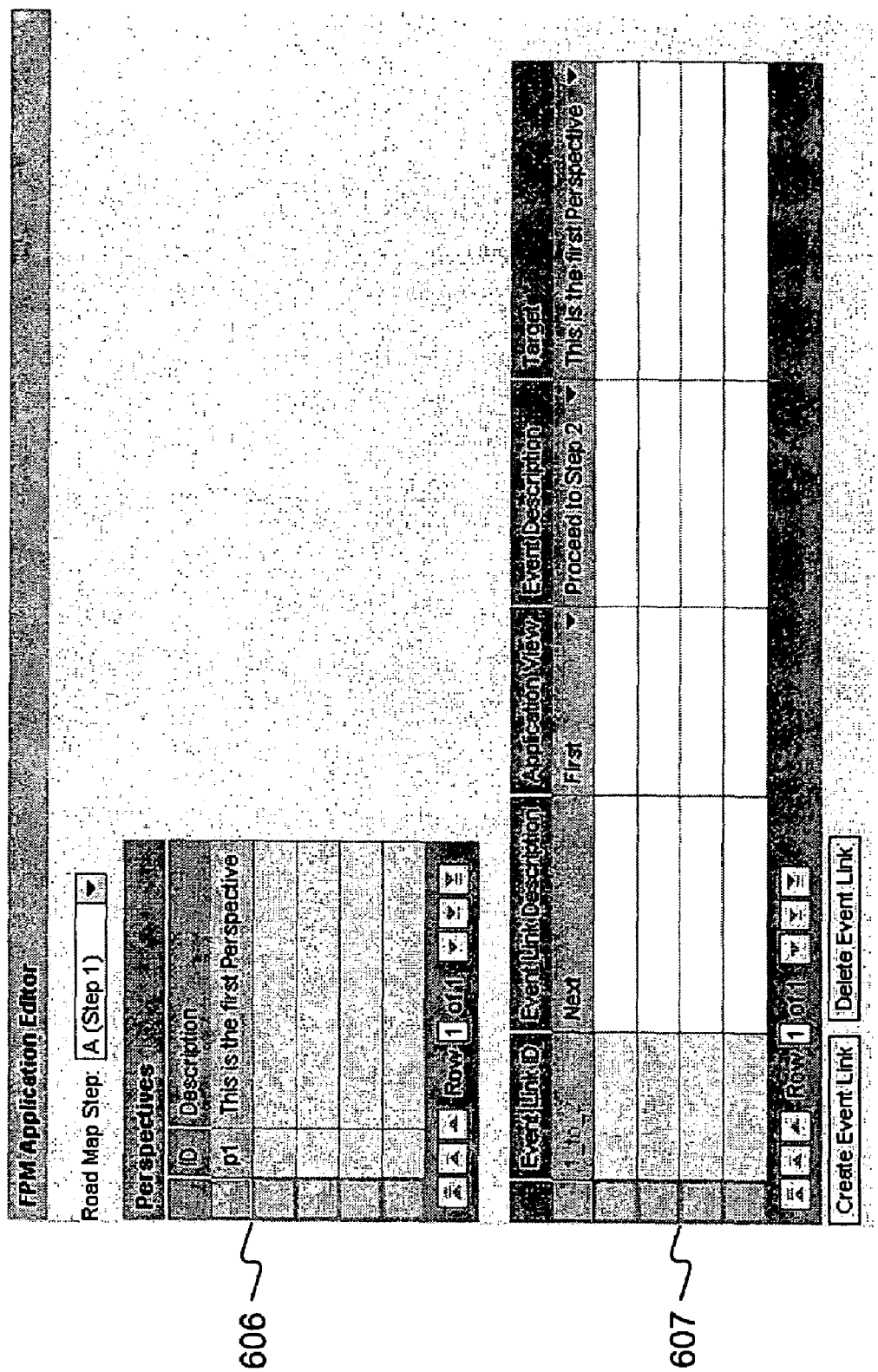

Exemplary GUIs for an FPM application editor are shown in FIGS. 6a, 6b, and 6c. In one embodiment of the present invention, an FPM application may be created in three steps: define the roadmap, define the perspectives, and set-up event links between perspectives. The FPM application editor thus allows an administrator or other user associated with the customer to configure the FPM application.

FIG. 6a shows an exemplary screen or GUI for defining a roadmap. It contains two tables—table 601 for the main roadmap steps, and table 602 for sub-roadmap steps of the currently selected roadmap. An administrator or other user may enter information into these tables to define the roadmap—i.e. by selecting the number of steps, naming the steps, etc.

FIG. 6b shows an exemplary GUI for defining perspectives. It contains two tables—tables 603 and 604, both of which may be used to define perspectives. These tables allow the administrator or other user to assign specific views to specific perspectives. This correlation may also be done with the aid of an object browser displayed on the screen, such as object browser 605. In addition, an FPM view may be assigned to more than one perspective. In this regard, the application editor may include an additional feature that allows a user to easily assign an existing view to a perspective by selecting an 'add existing view' button.

FIG. 6c illustrates an exemplary GUI for creating event links between perspectives. The example of FIG. 6c contains two tables—table 606 and table 607. Using these tables, a list of event links specifying the target of a certain navigation event is assigned to every perspective. Thus, an administrator or other user may determine which events give rise to which perspectives by configuring event links. The administrator or other user may thus define the order in which perspectives will appear in the customized self-service application.

The editor programs illustrated through FIGS. 4, 5, 6a, 6b, and 6c are exemplary only and are only intended to provide an example of an editor program that may be implemented by the present invention. Thus, any editor program that provides a user with the ability to customize an FMP application may be used.

Figure 7:
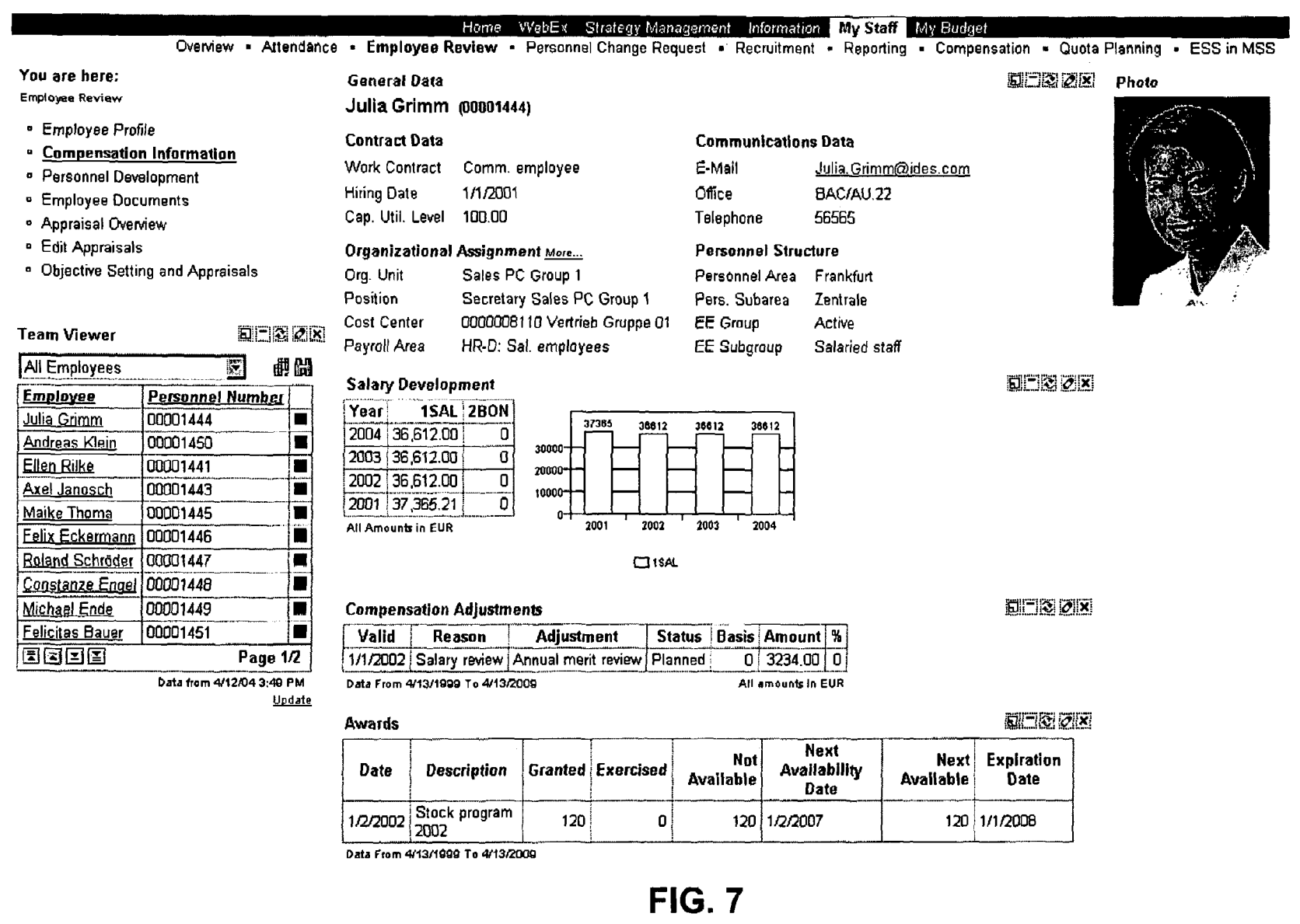

FIG. 7 shows an exemplary view of a particular perspective created as a result of an administrator's selection of components and patterns to include in a self-service application. For example, the perspective includes a detail navigation pattern that allows a user to select a view from a number of categories, such as "Employee Profile," "Compensation Information," "Personal Development," etc., as well as a "Team Viewer" drop down box, and particular tables and text areas of information.

In an exemplary embodiment of the present invention, the selections (i.e., customizations) made by an administrator or other user in editing the FMP application are stored as delta objects in a customer namespace database (see, e.g., customer namespace 103e shown in FIG. 1). The delta objects can also be stored using any other storage structure, such as a cache or a text file, for example. The delta objects keep track of differences between a floorplan provided by the developer 102 and a customized self-service application created by the customer. Maintaining a separate storage for the delta objects helps prevent customized self-service applications from being corrupted by upgrades and patches made to the floorplan application. Thus, the developer 102 can implement changes and patches to the core underlying floorplan application without affecting the customer's customization.

Figure 8:
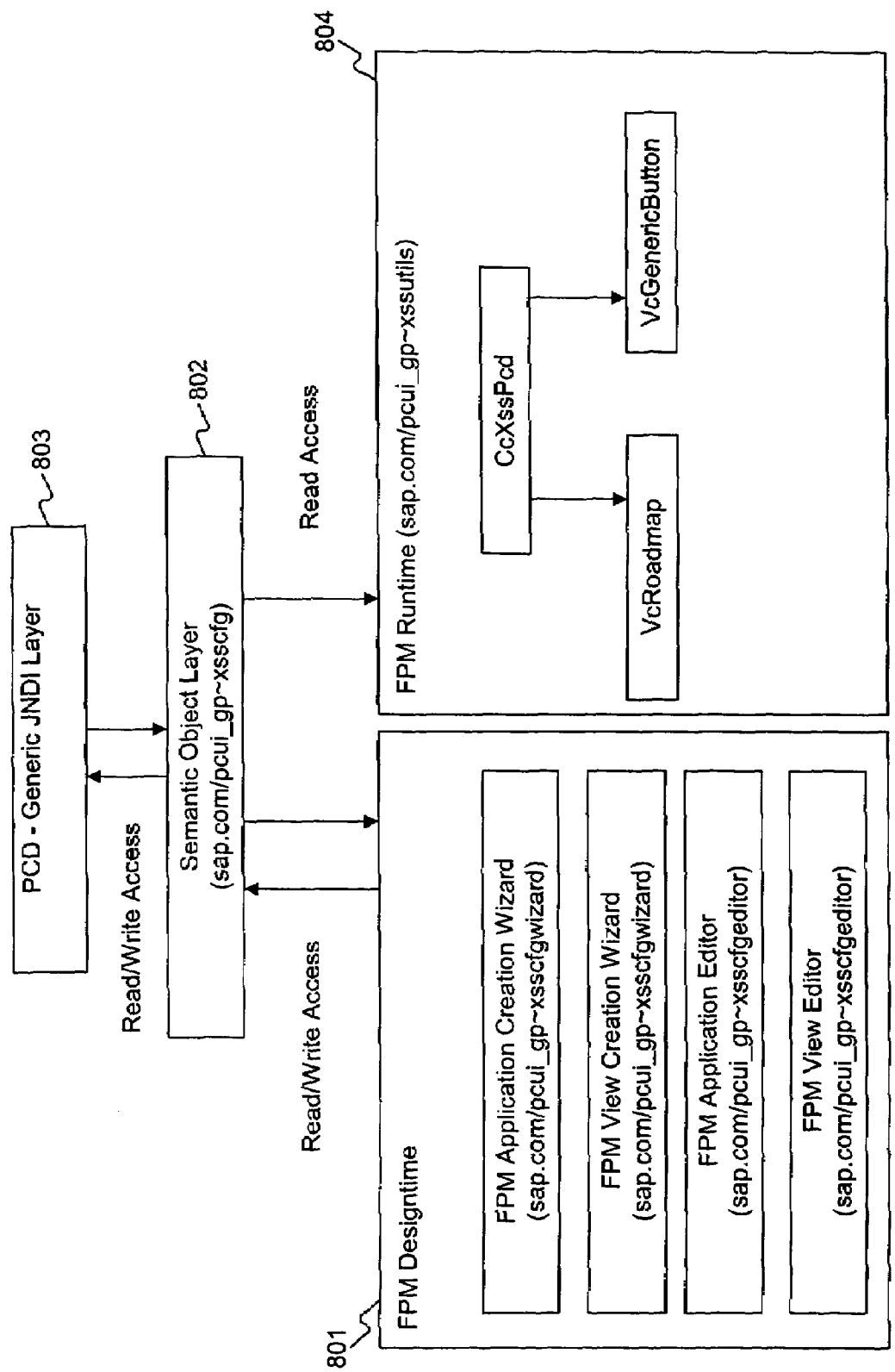
FIG. 8 is an architectural overview of an exemplary software implementation, consistent with certain embodiments of the present invention.

In carrying out methods, systems, and computer program products consistent with the present invention, the programming architecture may be separated into a design element and a runtime element, as shown by the example of FIG. 8. According to this architecture, the FPM Application is customized using certain programs, such as for example the FPM Application Creation Wizard, FPM View Creation Wizard, FPM Application Editor, and FPM View Editor, as shown in box 801. These programs, which may be stored at the customer server computer system 103a, contain the floorplan applications and editing tools developed by the developer 102. The customized design implementations are then stored by using the APIs of the Semantic Object Layer 802, which may also be stored at the customer server computer system 103a, and are then converted to a more generic form at the Generic JNDI Layer 803. When a user wishes to use a self-service application, a runtime program 804 converts the customized design implementations back into the Semantic Object Layer format, and then reads the customized design implementations to create the FPM application.

In accordance with an additional embodiment of the present invention, end users of a customized application may be allowed to add their own additional customization to the application. Thus, customization is not limited to those features selected by the customer. By way of example, a customer may elect to leave certain components and/or patterns to be selected and customized by an end user of the FPM application. For example, as shown in FIG. 9, an end user may personalize a view by selecting specific categories and/or time limits to be displayed. FIG. 9 is only one example of this feature, however. Moreover, the customer may elect to allow end users to configure whatever properties that are defined in VACs.

Figure 10:
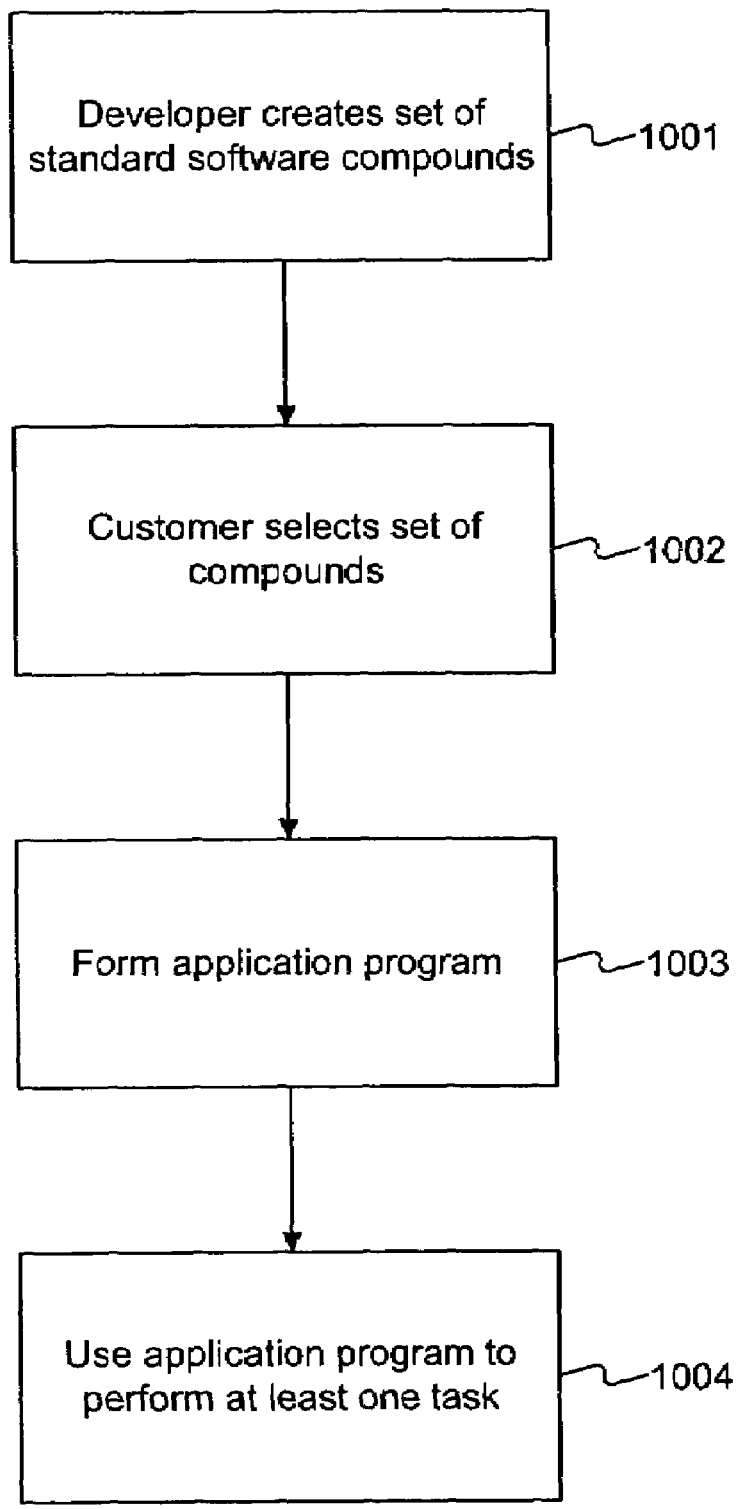
FIG. 10 is a block diagram of an exemplary software customization method, consistent with certain embodiments of the present invention.
Figure 11:
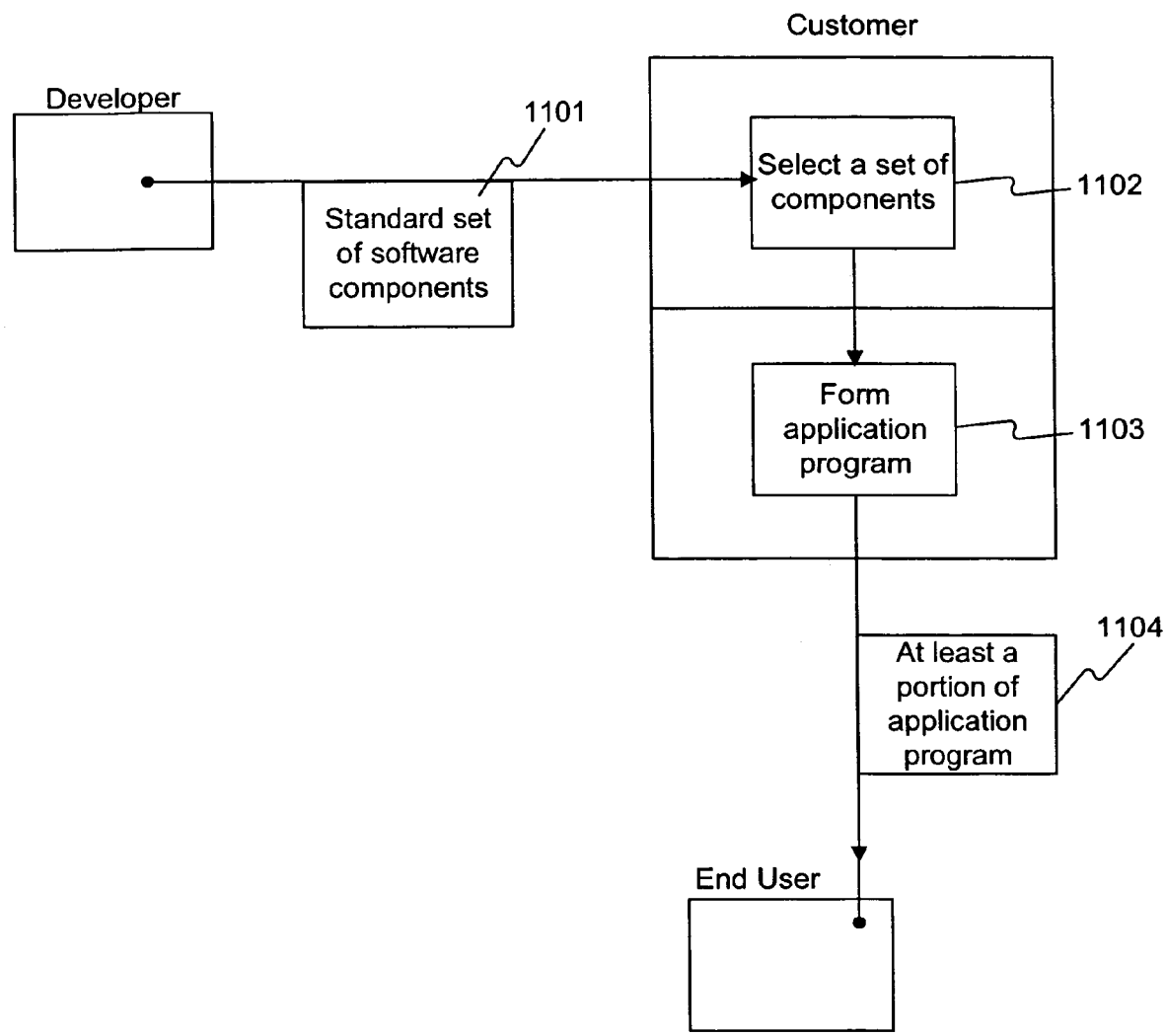
FIG. 11 is a block diagram of an exemplary software customization method, consistent with certain embodiments of the present invention.

Consistent with the description above, FIGS. 10 and 11 illustrate exemplary methods of the present invention. In particular, FIG. 10 shows an exemplary method for customizing a software application. In step 1001, a software developer or other appropriate entity creates a set of standard software components. In one embodiment, these components may comprise the VACs, CCs, and BLCs described above. Next, in step 1002, a customer selects a set of components. According to one embodiment, the selection may be accomplished with the aid of an editor program and GUI(s), such as those described herein. In step 1003, a customized application is formed based on the customer's selections. Thereafter, in step 1004, an end user or other entity may use the customized application to perform one or more tasks.

FIG. 11 shows an exemplary method for providing customized application programs. In step 1101, a standard set of computer software components created by a developer or other entity is provided to a customer. In one embodiment, these components may comprise the VACs, CCs, and BLCs described above. Next, in step 1102, a set of components selected from the standard set of components is identified. According to one embodiment, the selection may be accomplished with the aid of the an editor program and GUI(s), such as those described herein. In step 1103, a customized application program (e.g., a self-service application) is formed based on the identified selected set of components. In step 1104, at least a portion of the customized application program is provided to an end user to allow the end user to perform at least one task.

Accordingly, systems, methods, and computer program products consistent with embodiments of the present invention provide customers with customized applications, such as customized self-service applications. While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of embodiments of the invention being indicated by the following claims and their full scope of equivalents. Other embodiments of the invention will be apparent to those skilled in the art from consideration of the specification and practice of the embodiments of the invention disclosed herein.

What is claimed is:

1. A computer-implemented method for customizing a software application, comprising:
   providing to a customer a standard set of components for the software application, the standard set of components being created and stored by a developer and comprising visual application components, business logic components, and configuration components;
   identifying a selected set of components from the standard set of components based on selections made by the customer;
   providing to the customer at least one delta object tracking the differences between the standard set of components and the selected set of components, wherein the at least one delta object is stored by the customer in a customer namespace database; and
   forming a customized application program by combining the at least one delta object stored by the customer with the standard set of components stored by the developer, wherein the customized application program is capable of performing at least one task for an end user.

2. The method of claim 1, wherein one or more of the visual application components, business logic components, and configuration components may be selected by the customer to form the customized application program.

3. The method of claim 1, wherein at least one of the components of the standard set of components comprises a roadmap pattern component or a context assistance pattern component.

4. The method of claim 1, wherein the step of identifying is performed with the aid of an editor application program.

5. The method of claim 1, wherein the customized software application comprises a self-service application.

6. The method of claim 5, wherein the self-service application comprises at least one of: a time-management application, an employee management application, and an employee compensation application.

7. A system for providing customizable application programs, the system comprising:
   a standard set of computer software components, embodied on a computer-readable storage medium, comprising visual application components, business logic components, and configuration components, the standard set of computer software components defining a floorplan of an application program;
   an editor application configured to permit a customer, using an input device, to select from the standard set of computer software components and identify a selected set of components, wherein the differences between the standard set of computer software components and the selected set of components are tracked by at least one delta object stored by the customer in a customer namespace database; and
   an application compiler configured to form, using instructions stored in memory and executed by a processor, a customized floorplan of the application program by combining the at least one delta object stored in the customer namespace database with the standard set of computer software components embodied on the computer-readable storage medium.

8. The system of claim 7, wherein the customized floorplan of the application program provides a customized application program that is capable of performing at least one task.

9. The system of claim 7, wherein one or more of the visual application components, business logic components, and configuration components can be selected by the customer to form the customized floorplan of the application program.

10. The system of claim 7, wherein at least one of the components of the standard set of computer software components comprises a roadmap pattern component or a context assistance pattern component.

11. The system of claim 7, wherein the application program comprises a self-service application.

12. The method of claim 11, wherein the self-service application comprises at least one of: a time-management application, an employee management application, and an employee compensation application.

13. A computer-implemented method for providing customizable application programs, comprising:
    providing to a customer a standard set of computer software components, the computer software components being stored by a developer and comprising visual application components, business logic components, and configuration components;
    identifying a selected set of components from the standard set of computer software components based on selections made by the customer;
    providing to the customer at least one delta object tracking the differences between the standard set of computer software components and the selected set of components, wherein the at least one delta object is stored by the customer in a customer namespace database; and
    forming a customized application program by combining the at least one delta object stored by the customer with the standard set of computer software components stored by the developer.

14. The method of claim 13, wherein one or more of the visual application components, business logic components, and configuration components may be selected by the customer to form the customized application program.

15. The method of claim 13, wherein at least one of the components of the standard set of computer software components comprises a roadmap pattern component or a context assistance pattern component.

16. The method of claim 13, wherein the step of identifying is performed with the aid of an editor application program.

17. The method of claim 13, wherein the customized application program comprises a self-service application.

18. The method of claim 17, wherein the self-service application comprises at least one of: a time-management application, an employee management application, and an employee compensation application.

19. A computer program product embodied on a non-transitory computer-readable storage medium and including instructions that, when executed by a processor, cause the processor to:
    provide to a customer a standard set of components for the software application, the standard set of components being created and stored by a developer and comprising visual application components, business logic components, and configuration components;
    identify a selected set of components from the standard set of components based on selections made by the customer;
    provide to the customer at least one delta object tracking the differences between the standard set of components and the selected set of components, wherein the at least one delta object is stored by the customer in a customer namespace database; and
    form a customized application program by combining the at least one delta object stored by the customer with the standard set of components stored by the developer, wherein the customized application program is capable of performing at least one task for an end user.

20. The computer program product of claim 19, wherein the set of software components is part of a larger set of components, and wherein the larger set of components may be used to define additional floorplans.

21. The computer program product of claim 20, wherein the editor program is further configured to permit a customer to create additional customized application programs based on the additional floorplans.

22. The computer program product of claim 19, wherein the customized application program comprises a self-service application.

23. The computer program product of claim 22, wherein the self-service application comprises at least one of: a time-management application, an employee management application, and an employee compensation application.

* * * * *